United States Patent
Vembunarayan et al.

(10) Patent No.: US 10,043,157 B2
(45) Date of Patent: Aug. 7, 2018

(54) JOB POSTING STANDARDIZATION AND DEDUPLICATION

(71) Applicant: Microsoft Technology Licensing, LLC, Redmond, WA (US)

(72) Inventors: Jana Vembunarayan, Sunnyvale, CA (US); Sachit Kamat, San Carlos, CA (US); Prashanth Govindarajan, San Jose, CA (US); Anthony Duane Duerr, Castro Valley, CA (US); Oeystein Thorsen, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 325 days.

(21) Appl. No.: 14/502,261

(22) Filed: Sep. 30, 2014

(65) Prior Publication Data
US 2016/0092839 A1    Mar. 31, 2016

(51) Int. Cl.
*G06F 17/30* (2006.01)
*G06Q 10/10* (2012.01)

(52) U.S. Cl.
CPC ... *G06Q 10/1053* (2013.01); *G06F 17/30864* (2013.01); *G06F 17/30867* (2013.01)

(58) Field of Classification Search
CPC ............. G06F 17/3053; G06F 17/3087; G06F 17/30867; G06F 17/30911
See application file for complete search history.

(56) References Cited

U.S. PATENT DOCUMENTS

| | | | |
|---|---|---|---|
| 7,197,771 B2 | 4/2007 | Hollander | |
| 7,827,618 B2 | 11/2010 | Arthur-mensah et al. | |
| 8,135,704 B2 | 3/2012 | Hyder et al. | |
| 8,375,026 B1 | 2/2013 | Elliott et al. | |
| 8,494,929 B1 | 7/2013 | Borgen et al. | |
| 2001/0013047 A1 | 8/2001 | Marques | |
| 2004/0098783 A1 | 5/2004 | Parson et al. | |

(Continued)

FOREIGN PATENT DOCUMENTS

| | | |
|---|---|---|
| CN | 107004167 A | 8/2017 |
| IN | 201717014852 | 9/2017 |
| WO | WO-2016053382 A1 | 4/2016 |

OTHER PUBLICATIONS

Burk, Hunter, Faizan Javed, and Janani Balaji. "Apollo: Near-Duplicate Detection for Job Ads in the Online Recruitment Domain." Data Mining Workshops (ICDMW), 2017 IEEE International Conference on. IEEE, 2017.*

(Continued)

*Primary Examiner* — Nan Hutton
(74) *Attorney, Agent, or Firm* — Schwegman Lundberg & Woessner, P.A.

(57) ABSTRACT

Techniques for standardizing and deduplicating unpaid job postings obtained from third-party systems are described. An unpaid job posting is obtained by a social networking service from a third-party system. The title and description of the unpaid job posting are standardized and combined into a standardized unpaid job posting. A deduplication process is performed to prevent the standardized unpaid job posting from replacing a paid job posting within the social networking service, and to prevent the standardized unpaid job posting from replacing a more authoritative, unpaid job posting within the social networking service.

15 Claims, 7 Drawing Sheets

(56) References Cited

U.S. PATENT DOCUMENTS

| | | |
|---|---|---|
| 2006/0022899 A1 | 2/2006 | Johnson et al. |
| 2006/0229899 A1* | 10/2006 | Hyder ............... G06F 17/30873 705/1.1 |
| 2008/0065630 A1* | 3/2008 | Luo .................... G06F 17/30569 |
| 2008/0065633 A1* | 3/2008 | Luo .................... G06F 17/30867 |
| 2009/0063468 A1 | 3/2009 | Berg |
| 2012/0297524 A1 | 11/2012 | Stem et al. |
| 2013/0232171 A1 | 9/2013 | Cheng et al. |
| 2014/0149206 A1 | 5/2014 | Dubey et al. |
| 2016/0092838 A1 | 3/2016 | Hardtke et al. |

OTHER PUBLICATIONS

Malherbe, Emmanuel. Standardization of textual data for comprehensive job market analysis. Diss. Université Paris-Saclay, 2016.*
"International Application Serial No. PCT/US2015/022480, International Search Report dated Jul. 31, 2015", 4 pgs.
"International Application Serial No. PCT/US2015/022480, Invitation to Pay Add'l Fees and Partial Search Report dated May 18, 2015", 2 pgs.
"International Application Serial No. PCT/US2015/022480, Written Opinion dated Jul. 31, 2015", 10 pgs.
U.S. Appl. No. 14/502,224, filed Sep. 30, 2014, Job Posting Standardization and Deduplication.
"U.S. Appl. No. 14/502,224, Final Office Action dated Mar. 20, 2017", 17 pgs.
"U.S. Appl. No. 14/502,224, Non Final Office Action dated Oct. 25, 2016", 12 pgs.
"U.S. Appl. No. 14/502,224, Response filed Jan. 5, 2017 to Non Final Office Action dated Oct. 25, 2016", 11 pgs.
"International Application Serial No. PCT/US2015/022480, International Preliminary Report on Patentability dated Apr. 13, 2017", 9 pgs.

* cited by examiner

JOB POSTING STANDARDIZATION AND DEDUPLICATION

TECHNICAL FIELD

The present disclosure generally relates to data processing systems for hosting job postings and, in some embodiments, to techniques for standardizing and deduplicating job postings found on disparate third-party systems.

BACKGROUND

In a typical job hosting service, a representative of a company will post a job posting to the job hosting service so that users of the job hosting service can search for, browse, and in some cases, apply for the job associated with the particular job posting. In exchange for making the job posting available for presentation to the users of the job hosting service, the company on whose behalf the job posting is posted will typically pay a fee.

BRIEF DESCRIPTION OF THE DRAWINGS

Some embodiments are illustrated by way of example and not limitation in the figures of the accompanying drawings.

DETAILED DESCRIPTION

Figure 1:
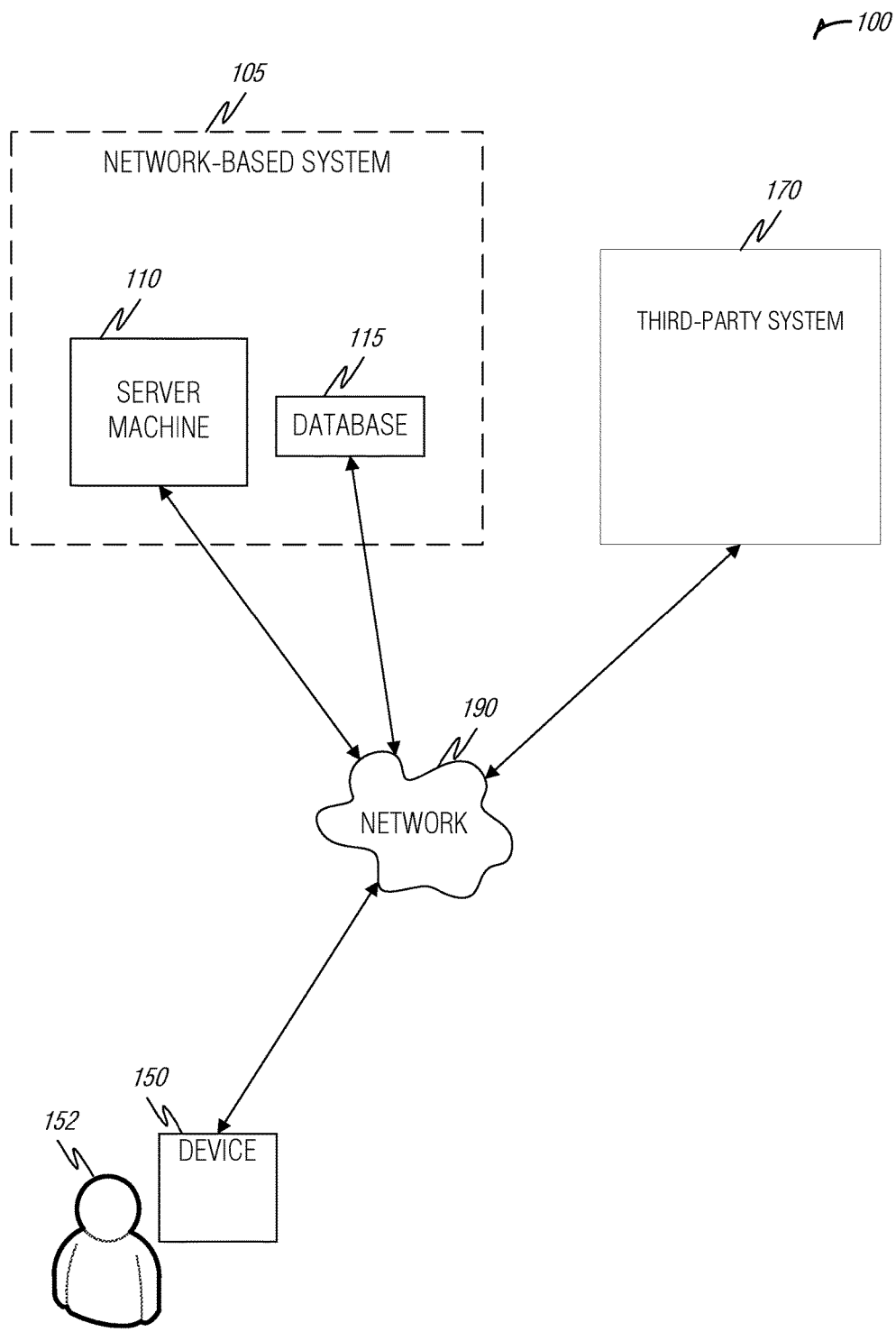
FIG. 1 is a network diagram illustrating a network environment suitable for a social networking service, in accordance with some example embodiments.

The present disclosure describes methods, systems, and computer program products that individually provide a job hosting service that provides differing levels of service to paid and unpaid job postings (sometimes referred to as job postings). In the following detailed description, for purposes of explanation, numerous specific details are set forth in order to provide a thorough understanding of the various aspects of the presently disclosed subject matter. However, it will be to those skilled in the art that the presently disclosed subject matter may be practiced without these specific details. In other instances, well-known methods, procedures, and components have not been described in detail so as not to obscure the presently disclosed subject matter.

Consistent with some embodiments, a job hosting service (e.g., associated with a social networking system) hosts both paid and unpaid job postings. For example, via a job-posting module of the job hosting service, users of the job hosting service can provide information about a particular job opening and generate a paid job posting. A job posting typically is comprised of the name of the company or organization at which the job opening is available, the job title for the job opening, a description of the job functions, the required or recommended skills, education, and certifications and/or expertise, etc. In exchange for the payment of a fee, the paid job posting will be eligible for presentation to users (e.g., members of the social networking system with which the job hosting service is integrated).

In some embodiments, a job hosting service can host paid job postings and unpaid job postings. In some instances, a paid job posting can be listed directly on the job hosting service, and an unpaid job posting can be received from a third-party system. However, the data format of the job postings received from a third-party system may not match the data format used by the job hosting service for its job postings. Furthermore, a job posting received from a third-party system may represent a job posting already listed by the job hosting service.

In addition to paid job postings, the job hosting service may ingest job postings from various externally hosted third-party job sites. In some embodiments, an automated computer program (e.g., a "bot" or "spider") automatically "crawls" relevant Internet sites and discovers job postings for ingestion. In some embodiments, job postings are obtained from a data feed maintained by one or more third-party partners. The job hosting service stores, or causes another entity to store on its behalf, both paid job postings—that is, job postings that have been generated through a job-posting module and for which a fee has been paid to the social networking system—and, unpaid job postings—that is, job postings obtained from a third-party site, for which a fee has not been paid to the social networking system.

In some embodiments, the unpaid job postings are only eligible for presentation to members of a social networking service through a job search interface. Accordingly, the unpaid or free job postings will typically only be presented to social networking service members that might be referred to as "active job seeking candidates" or "active job seekers". These active job seekers are members who are typically actively engaged in the process of looking for new career opportunities. The paid job postings are also eligible for presentation to members of the social networking service through the search interface, but are also presented to members through various other channels. For example, a job recommendation engine may match member profiles with job postings, with the objective of presenting a member of the social networking service with relevant job postings—that is, job postings that might be of interest to the member, based on that member's profile data.

In some embodiments, the data format of the job postings received from a third-party system may not match the data format used by the job hosting service of the social networking system for its job postings. In such embodiments, the job hosting service standardizes the job postings received from third-party systems, so that the job postings can be integrated into the job hosting service.

In some embodiments, a job posting received from a third-party system represents a job posting already integrated into the job hosting service. In such embodiments, the job hosting service performs a job posting deduplication and replaces the already-integrated job posting with the new job posting if the new job posting is determined to be superior (e.g., more authoritative) to the already-integrated job posting.

The various operations of the example methods described herein may be performed, at least partially, by one or more processors that are temporarily configured (e.g., by software instructions) or permanently configured to perform the relevant operations. Whether temporarily or permanently configured, such processors may constitute processor-implemented modules or objects that operate to perform one or more operations or functions. The modules and objects referred to herein, in some example embodiments, may comprise processor-implemented modules and/or objects.

Similarly, the methods described herein may be at least partially processor-implemented. For example, at least some of the operations of a method may be performed by one or more processors or processor-implemented modules. The performance of certain operations may be distributed among the one or more processors, not only residing within a single machine or computer, but also deployed across a number of machines or computers. In some example embodiments, the processor or processors may be located in a single location (e.g., within a home environment, an office environment, at a server farm, etc.), while in other embodiments, the processors may be distributed across a number of locations.

The one or more processors may also operate to support performance of the relevant operations in a "cloud computing" environment or within the context of software as a service ("SaaS"). For example, at least some of the operations may be performed by a group of computers (as examples of machines including processors), these operations being accessible via a network (e.g., the Internet) and via one or more appropriate interfaces (e.g., Application Program Interfaces (APIs)).

FIG. 1 is a network diagram illustrating a network environment 100 suitable for a social networking service, in accordance with some example embodiments. The network environment 100 includes a server machine 110, a database 115, and a device 150 for a user 152, all communicatively coupled to each other via a network 190. The server machine 110 may form all or part of a network-based system 105 (e.g., a cloud-based server system configured to provide one or more services to the devices 130 and 150). The database 115 can store job postings for the social network service. The server machine 110, the first device 130, and the second device 150 may each be implemented in a computer system, completely or in part, as described below with respect to FIG. 5.

Also shown in FIG. 1 is user 152. User 152 may be a human user (e.g., a human being), a machine user (e.g., a computer configured by a software program to interact with the device 150), or any suitable combination thereof (e.g., a human assisted by a machine or a machine supervised by a human). User 152 is not part of the network environment 100, but is associated with the device 150. In some embodiments, the device 150 is a desktop computer, a vehicle computer, a tablet computer, a navigational device, a portable media device, a smartphone, or a wearable device (e.g., a smart watch or smart glasses) operated by the user 152.

Any of the machines, databases, or devices shown in FIG. 1 may be implemented in a general-purpose computer modified (e.g., configured or programmed) by software (e.g., one or more software modules) to be a special-purpose computer to perform one or more of the functions described herein for that machine, database, or device. For example, a computer system able to implement any one or more of the methodologies described herein is discussed below with respect to FIG. 5. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases, and devices (e.g., the server machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., a Wi-Fi® or WiMax® network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
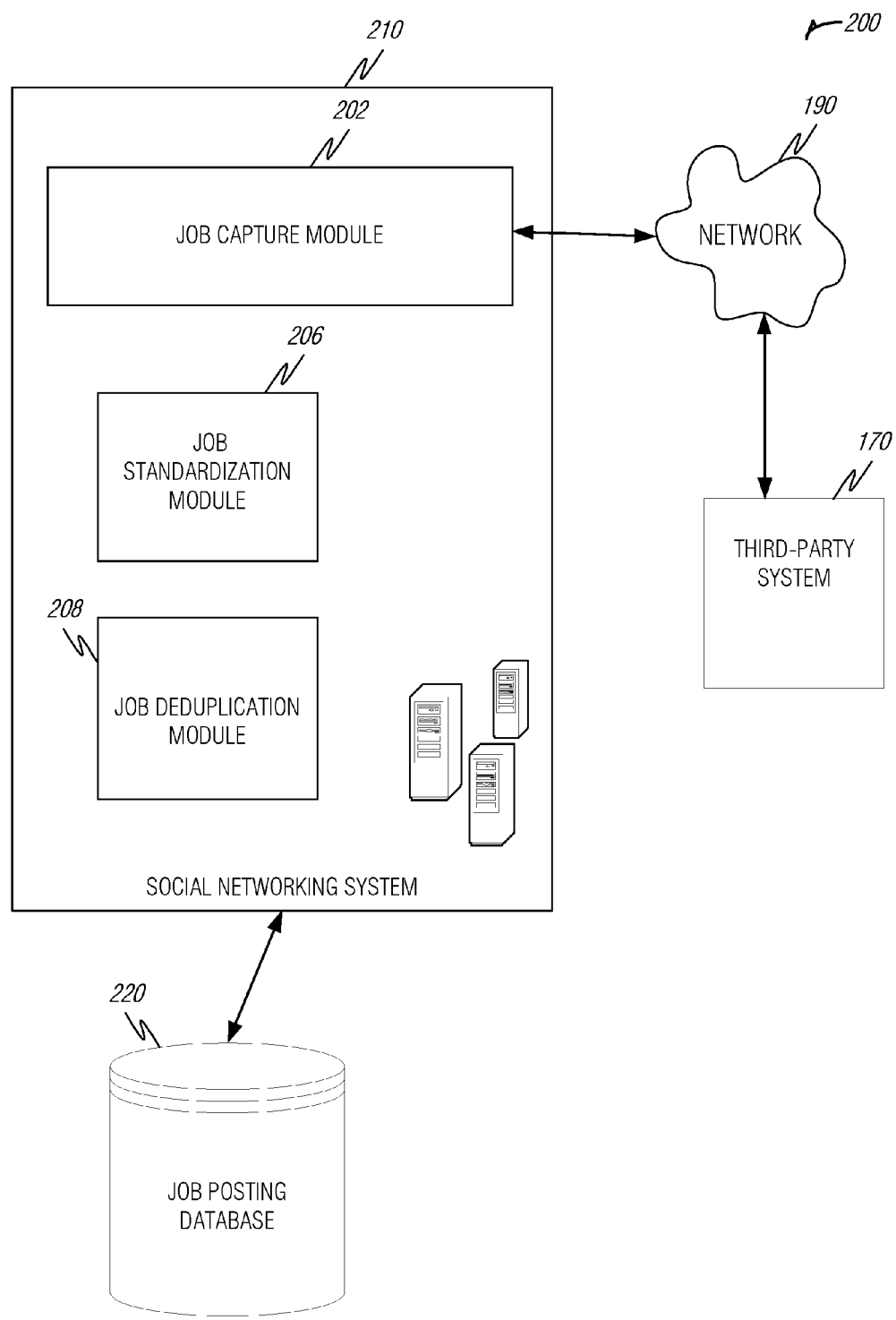
FIG. 2 is a block diagram illustrating components of a social networking system, in accordance with some example embodiments.

FIG. 2 is a block diagram illustrating components of a social networking system 210, in accordance with some example embodiments. The social networking system 210 is an example of a network-based system 105 of FIG. 1. In some embodiments, the social networking system 210 includes a job capture module 202, an application server module 204, a job standardization module 206, and a job deduplication module 208 all configured to communicate with each other (e.g., via an interlink, a bus, shared memory, a switch, etc.)

Although FIG. 2 illustrates job posting database 220 as a single database, job posting database 220 may include multiple databases, which may be located in one location or in multiple locations. Similarly, although FIG. 2 illustrates job posting database 220 as being distinct from social networking system 210, in some embodiments, job posting database 220 is incorporated within social networking system 210.

In some embodiments, the job capture module 202 captures, receives, or otherwise acquires a job posting from a third-party system 170. As described in FIGS. 3A and 3B, in some embodiments, the job standardization module 206 standardizes the job posting before integrating the job posting into job posting database 220. As described in FIGS. 4A and 4B, the job deduplication module 208 integrates the job posting into job posting database 220 if such integration would not result in an inferior job posting replacing a superior job posting.

In some instances, the job capture module 202, the job standardization module 206 and/or the job deduplication module 208 are configured to process data offline and/or periodically. For example, the job capture module 202 can include servers, which periodically acquire job postings from relevant third-party Internet sites. Standardizing and de-duplicating the third-party job postings may be computationally intensive; therefore, the job standardization and/or deduplication may be done offline.

Figure 3A:
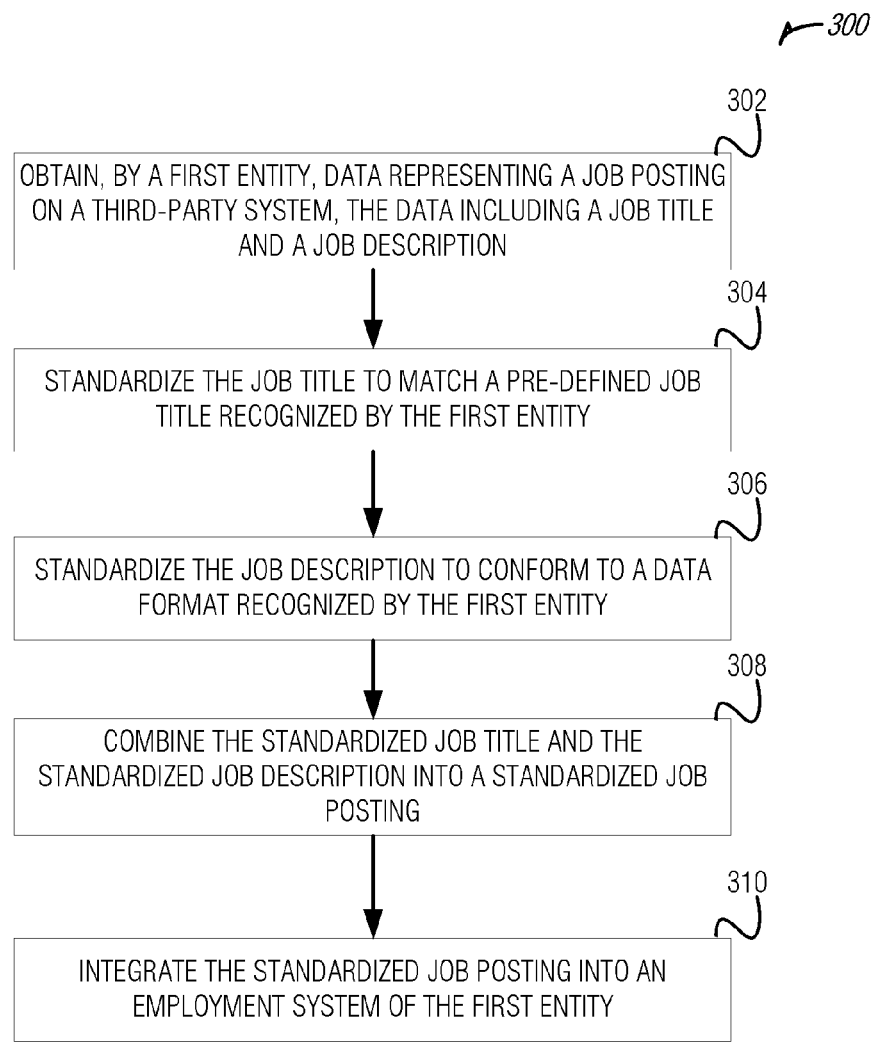
FIG. 3A is a flowchart illustrating operations of a job capture module and a job standardization module in performing a method for standardizing a job posting obtained from a third-party system, in accordance with some example embodiments.
Figure 3B:
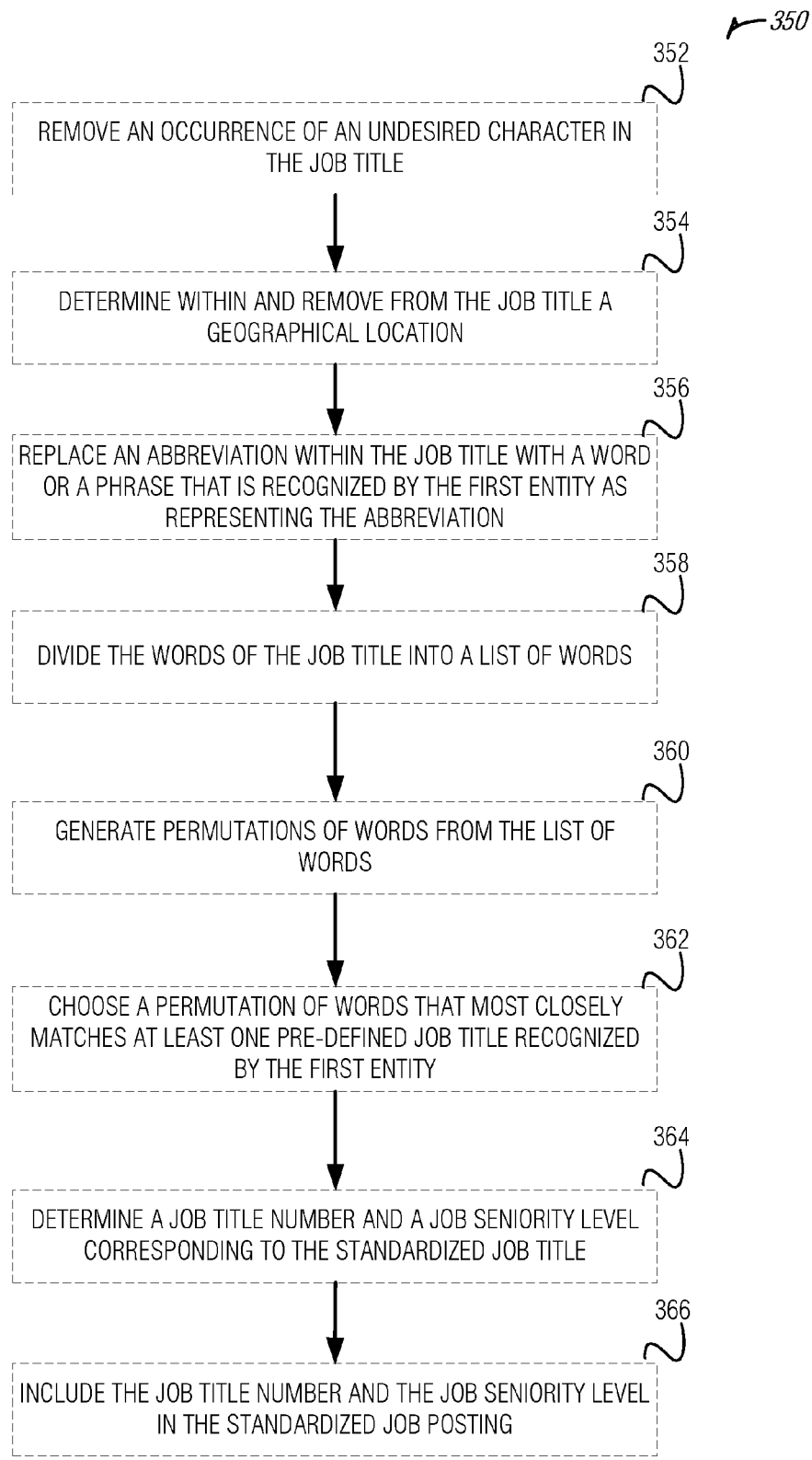
FIG. 3B is a flowchart illustrating optional operations of the job standardization module in performing a method for standardizing a job posting obtained from a third-party system, in accordance with some example embodiments.

As will be further described with respect to FIGS. 3A-3B, the job capture module 202 in conjunction with the job standardization module 206 can obtain and standardize an unpaid job posting to integrate into the job posting database 220.

Any one or more of the modules described herein may be implemented using hardware (e.g., one or more processors of a machine) or a combination of hardware and software. For example, any module described herein may configure a processor (e.g., among one or more processors of a machine) to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

In some embodiments, job posting database 220 contains a set of pre-defined job titles recognized by the job hosting service. For example, the set of pre-defined job titles may include job titles such as "Account Executive," "Systems Engineer," "Sales Manager," etc. In some embodiments, job posting database 220 contains a set of pre-defined job seniority levels recognized by the job hosting service. For example, the set of pre-defined job seniority levels may include seniority levels such as "Intern," "Entry-level," "Mid-level," "Senior-level," "Management," "Executive," etc.

FIG. 3A is a flowchart illustrating operations of job capture module 202 and job standardization module 206 in performing a method 300 for standardizing a job posting obtained from a third-party system, in accordance with some example embodiments. Operations in the method 300 may be performed by network-based system 105, using modules described above with respect to FIG. 2. As shown in FIG. 3A, the method 300 includes operations 302, 304, 306, 308, and 310.

By obtaining and standardizing job postings from third-party systems, the job hosting service of the social networking system 210 can present its users with job postings from other job sources in addition to the job postings for which the social networking system is paid to present to its users.

At operation 302, a first entity (e.g., the job hosting service of social networking system 210) obtains (e.g., using job capture module 202) data representing a job posting on a third-party system 170. The job posting includes a job title and a job description. In some embodiments, the job posting also includes at least one of the following: an employer name, an employment industry, a geographical location of the job, and a required skill.

At operation 304, the job title of the job posting is standardized (e.g., using job standardization module 206) to match a pre-defined job title recognized by the first entity. In some embodiments, one or more operations 352 to 362 of method 350, illustrated in FIG. 3B, is performed as part of the job title standardization process.

At operation 306, the job description is standardized to conform to a data format recognized by the first entity. In some embodiments, standardizing the job description includes performing spell-checking/correction and/or grammar-checking/correction on the job description.

At operation 308, the standardized job title and the standardized job description are combined into a standardized job posting. In some embodiments, additional information, such as metadata, is also included in the standardized job posting.

At operation 310, the standardized job posting is integrated into an employment system (e.g., job hosting service) of the first entity (e.g., the social networking system 210). In some embodiments, a job deduplication process (e.g., method 400 of FIG. 4A) is performed on the standardized job posting prior to the integration of the standardized job posting.

FIG. 3B is a flowchart illustrating optional operations of job standardization module 206 in performing a method 350 for standardizing a job posting obtained from a third-party system, in accordance with some example embodiments. Operations in the method 350 may be performed by network-based system 105, using modules described above with respect to FIG. 2. As shown in FIG. 3B, the method 350 includes operations 352, 354, 356, 358, 360, 362, 364, and 366.

At operation 352, an occurrence of an undesired character in the job title is removed. For example, in some embodiments, periods are undesired within a job title. If the job title of the job posting was "S.E. in San Francisco, Calif.", removing the periods would result in a modified job title of "SE in San Francisco, Calif.". In some embodiments, the undesired character is removed with a regular expression applied to the job title.

At operation 354, a geographical location is determined to be within the job title and is removed from the job title. For example, if the job title input to this operation was "SE in San Francisco, Calif.", the job title output would be "SE".

At operation 356, an abbreviation within the job title is replaced with a word or a phrase that is recognized by the first entity as representing the abbreviation. For example, if the job title input to this operation was "SE", the job title would be "Systems Engineer".

In some embodiments, the abbreviation is disambiguated using context within the job title and/or context within the job description. In some embodiments, the abbreviation is disambiguated by reference to a number of occurrences of a word within the job description. For example, the abbreviation "SE" could represent a pre-defined job title such as "Systems Engineer," "Sales Engineer," "Sports Editor," Sanitation Engineer," "Structural Engineer," "Senior Engineer," etc. In some embodiments, if a potential match to a pre-defined job title occurs within the job description, this increases the probability of this potential match being the correct match.

At operation 358, the words of the job title are divided into a list of words. For example, if the job title input to this operation were "Systems Engineer," the output of this operation would be the list of words "systems" and "engineer".

At operation 360, all possible permutations of the words in the list of words are generated. For example, if the list of words were "systems" and "engineer", the possible permutations would be "systems engineer" and "engineer systems".

At operation 362, a permutation of words is chosen to be the standardized job title that most closely matches at least one pre-defined job title recognized by the first entity. For example, if the possible permutations were "systems engineer" and "engineer systems", "systems engineer" would be chosen as the standardized job title.

At operation 364, a job title number corresponding to the standardized job title is determined. For example, if the standardized job title is "Systems Engineer," the corresponding job title number within a particular job hosting service may be 525.

Also at operation 364, a job seniority level corresponding to the job title number is determined. For example, the job seniority level for job title number 525, which corresponds to "Systems Engineer", may be "Mid-level".

At operation 366, the job title number and the job seniority level are included in the standardized job posting. In some embodiments, the job title number and the job seniority level are included in the standardized job posting before the standardized job posting is integrated into the job posting database 220.

Figure 4A:
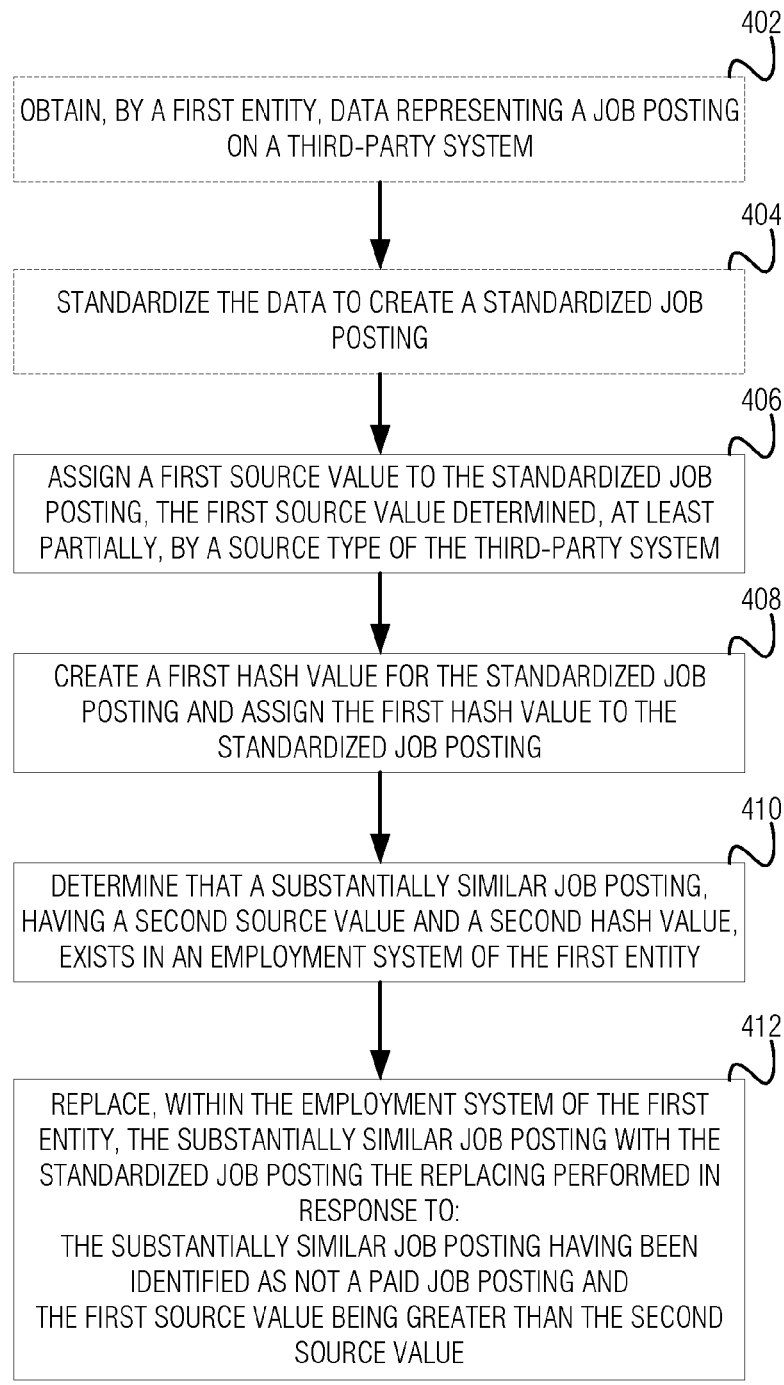
FIG. 4A is a flowchart illustrating operations of a job deduplication module, and optionally the job capture module and/or the job standardization module, in performing a method for deduplicating a job posting obtained from a third-party system, in accordance with some example embodiments.

FIG. 4A is a flowchart illustrating operations of job deduplication module 208, and optionally job capture module 202 and/or job standardization module 206, in performing a method 400 for deduplicating a job posting obtained from a third-party system, in accordance with some example embodiments. Operations in the method 400 may be performed by network-based system 105, using modules described above with respect to FIG. 2. As shown in FIG. 4A, the method 400 includes operations 402, 404, 406, 408, 410, and 412.

By deduplicating job postings from third-party systems, the job hosting service of the social networking system 210 can prevent presenting its users with duplicate job postings for the same job.

At operation 402, optionally, a first entity (e.g., the job hosting service of social networking system 210) obtains (e.g., using job capture module 202) data representing a job posting on a third-party system 170. In some embodiments, the job posting includes at least one of the following: a job title, a job description, an employer name, an employment industry, a geographical location of the job, and a required skill. In some embodiments, operation 402 of method 400 is substantially similar to operation 302 of method 300.

At operation 404, optionally, the job title of the job posting is standardized (e.g., using job standardization module 206) to match a pre-defined job title recognized by the first entity. In some embodiments, one or more operations 352 to 362 of method 350, illustrated in FIG. 3B, is performed as part of the job title standardization process.

At operation 406, a first source value is assigned to the standardized job posting. In some embodiments, the first source value is determined, at least partially, by a source type of the third-party system. For example, in some embodiments, three third-party source types are recognized: a web site of the employer of the job, an electronic applicant tracking system (ATS), and an electronic job board. Examples of an ATS include Taleo®, ADP®, among others. Examples of electronic job boards include Monster.com®, Indeed®, Craigslist®, among others.

In some embodiments, a hierarchy of source types exists. For example, a web site of the employer of the job is considered the highest in the source type hierarchy, an electronic ATS is considered the second highest in the source type hierarchy, and an electronic job board is considered the lowest in the source type hierarchy. Thus, a job posting obtained from an employer's own website will have a higher source value than that of a job posting obtained from an electronic ATS, which will in turn have a higher source value than that of a job posting obtained from an electronic job board.

Furthermore, source values may differ for job postings obtained from sources within the same source type. For example, a job posting obtained from dice.com may have a higher source value than a job posting obtained from Craigslist®. In some embodiments, an administrator of the job hosting service is able to assign source values to different types of sources (e.g., via a user interface).

At operation 408, a hash value for the standardized job posting is created and assigned to the standardized job posting. In some embodiments, the hash value is created based on the standardized job title, the geographical location, and the employer name.

In some embodiments, methods of comparing data other than hashing are used, such as checksums, statistical analysis methods, and machine learning methods, such as neural networks or other supervised learning methods.

At operation 410, a determination is made as to whether a substantially similar job posting to the standardized job posting exists in the job hosting service of the social networking system 210. In some embodiments using hashing, this determination is made by comparing the hash value, which was created for the standardized job posting at operation 408, to a plurality of hash values of job postings within the job hosting service of the social networking system 210.

In some embodiments using hashing, if the hash value for the standardized job posting sufficiently matches a hash value of a job posting already integrated into the job hosting service, then the standardized job posting and the already-integrated job posting are deemed substantially similar. In some embodiments, if the hash value for the standardized job posting sufficiently matches a hash value of a job posting already integrated into the job hosting service, a comparison of the bodies of the job descriptions of the two job postings is performed. In some embodiments, the comparison involves calculating or comparing an already calculated similarity measure for the two job postings. For example, a Jaccard similarity coefficient may be used to compare the similarities between the two job postings.

In some embodiments using a method of comparison other than hashing, various comparison techniques may be used to determine substantial similarity between job postings. For example, a comparison of similar attributes of the job postings and/or keywords within the job postings may be performed to determine substantial similarity.

In some embodiments, i the standardized job posting and the already-integrated job posting are substantially similar, the job posting with the highest source value is stored in the job hosting service, while the job posting with the lower source value is discarded. In the event both job postings have equal source values, the oldest job posting will be kept.

In some embodiments, if the standardized job posting and the already-integrated job posting are substantially similar, both job postings are kept and the job posting displayed to a user is determined at the time of, or just prior to, the display of the job posting. For example, if at the time of displaying a job posting for a particular job, a paid job posting for the job has expired and the paid job posting has not previously been displayed to the user, the standardized job posting will be displayed instead. If the expired, paid job posting has previously been displayed to the user, then the expired, paid job posting is displayed to the user as the job posting for the particular job.

In some embodiments, if a determination is made that a substantially similar job posting does not exist in the job hosting service, the standardized job posting is integrated into the job hosting service.

At operation 412, within the job hosting service, the substantially similar job posting is replaced with the standardized job posting. In some embodiments, the replacing is performed in response to the substantially similar job posting having been identified as not a paid job posting and the source value of the standardized job posting being greater than the source value of the substantially similar job posting in the job hosting service. Replacing when these conditions are met prevents an unpaid job posting from replacing a paid job posting within the job hosting service, and prevents a less authoritative, unpaid job posting from replacing a more authoritative, unpaid job posting within the job hosting service.

Figure 4B:
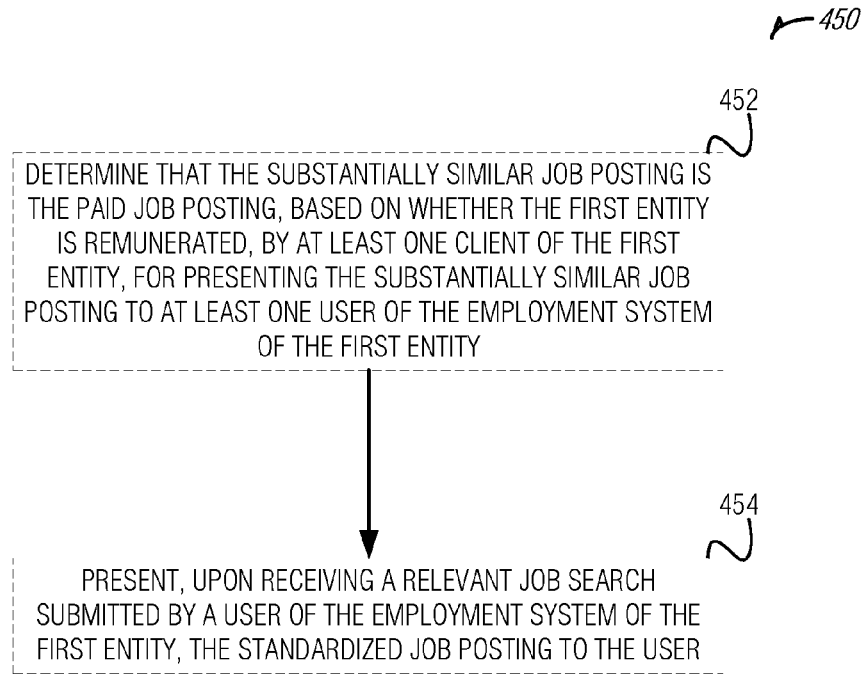
FIG. 4B is a flowchart illustrating optional operations of the job deduplication module in performing a method for deduplicating a job posting obtained from a third-party system, in accordance with some example embodiments.

FIG. 4B is a flowchart illustrating optional operations of job deduplication module 208 in performing a method 450 for deduplicating a job posting obtained from a third-party system, in accordance with some example embodiments. Operations in the method 450 may be performed by network-based system 105, using modules described above with respect to FIG. 2. As shown in FIG. 4B, the method 450 includes operations 452 and 454.

At operation 452, a determination is made that the substantially similar job posting is the paid job posting. In some embodiments, this determination is made, at least partially, based on whether the social networking system 210 is remunerated, by at least one client of the social networking system 210, for presenting the substantially similar job posting to at least one user 152 of the job hosting service of the social networking system 210. In some embodiments, this determination is made to prevent an unpaid job posting replacing a paid job posting within the job hosting service of the social networking system 210.

At operation 454, the standardized job posting is presented to a user 152 of the social networking system 210 upon receiving a relevant job search submitted by the user 152. In some embodiments, a user 152 of the social networking system 210 submits a job search within social networking system 210. In such embodiments, the social networking system 210 presents the user 152 with a set of job postings that are relevant to the submitted job search. In some embodiments, the job postings presented may include paid job postings, unpaid job postings, or some combination thereof.

Figure 5:
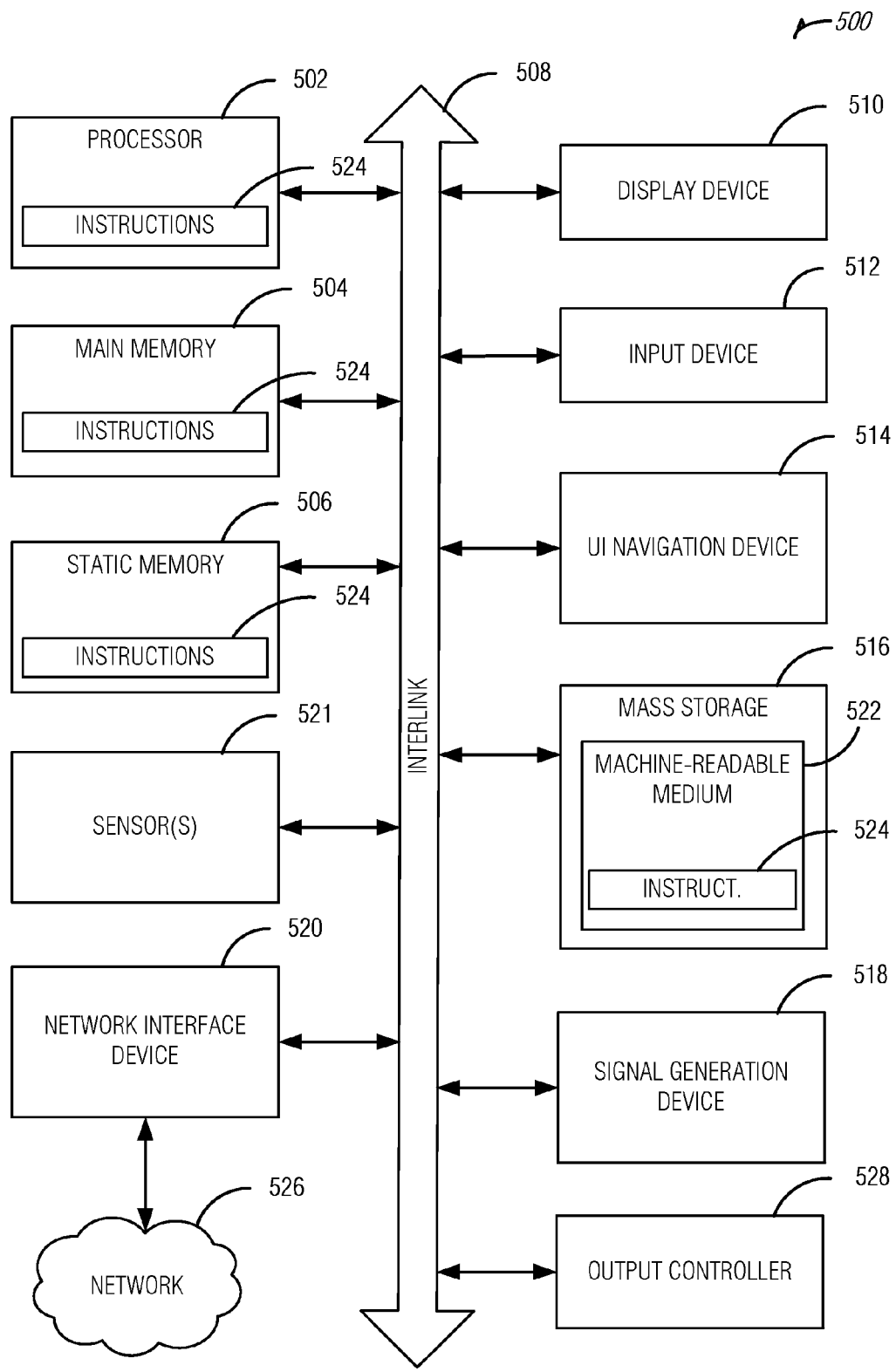
FIG. 5 is a block diagram illustrating an example of a machine, upon which one or more embodiments may be implemented.

FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may perform, alone or in combination, specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine-readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine-readable media.

Although the machine-readable medium 522 is illustrated as a single medium, the term "machine-readable medium" may include a single medium or multiple media (e.g., a centralized or distributed database, and/or associated caches and servers) configured to store the one or more instructions 524.

The term "machine-readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine-readable medium examples may include solid-state memories, and optical and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

Additional Notes & Example Embodiments

Example 1 includes subject matter (such as a method, a means for performing acts, or a machine-readable medium including instructions that, when performed by the machine cause the machine to performs acts) comprising: obtaining, by a first entity, data representing a job posting on a third-party employment system, the data including a job title and a job description; standardizing the job title to match at least one of a plurality of pre-defined job titles recognized by the first entity; standardizing the job description to conform to a data format recognized by the first entity; combining the standardized job title and the standardized job description into a standardized job posting; and integrating the standardized job posting into an employment system of the first entity.

Example 2 can include, or can optionally be combined with the subject matter of Example 1 to include, wherein standardizing the job title includes removing an occurrence of an undesired character, the removing performed using at least one regular expression.

Example 3 can include, or can optionally be combined with the subject matter of one or any combination of Examples 1 to 2 to include, wherein standardizing the job title includes at least one of: determining a geographical location within the job title and removing the determined geographical location from the job title; or determining an employer name within the job title and removing the determined employer name from the job title.

Example 4 can include, or can optionally be combined with the subject matter of one or any combination of Examples 1 to 3 to include, wherein standardizing the job title includes replacing an abbreviation within the job title with a word or a phrase that is recognized by the first entity as representing the abbreviation.

Example 5 can include, or can optionally be combined with the subject matter of one or any combination of Examples 1 to 4 to include, wherein replacing includes disambiguating the abbreviation using at least one of context within the job title and context within the job description.

Example 6 can include, or can optionally be combined with the subject matter of one or any combination of Examples 1 to 5 to include, wherein standardizing the job title includes: dividing the job title, comprising an ordered plurality of words, into a list of words; generating a plurality of permutations of words from the list of words; and choosing, from the plurality of permutations of words, a permutation of words that most closely matches at least one of the plurality of pre-defined job titles recognized by the first entity.

Example 7 can include, or can optionally be combined with the subject matter of one or any combination of Examples 1 to 6 to include, wherein standardizing the job title further includes determining a job title number and a job seniority level corresponding to the standardized job title, and wherein the job title number and the job seniority level are included in the standardized job posting.

Example 8 can include, or can optionally be combined with the subject matter of one or any combination of Examples 1 to 7 to include, wherein the standardized job posting includes at least one of an identification of a geographical location, an employer name, an employment industry, and a job skill.

Example 9 can include, or can optionally be combined with the subject matter of one or any combination of Examples 1 to 8 to include, subject matter (such as an apparatus, a device, or a system) comprising: a machine including a memory and at least one processor; a job capture module, executable by the machine, configured to obtain, by a first entity, data representing a job posting on a third-party employment system, the data including a job title and a job description; and a job standardization module, executable by the machine, configured to: standardize the job title to match at least one of a plurality of pre-defined job titles recognized by the first entity; standardize the job description to conform to a data format recognized by the first entity; combine the standardized job title and the standardized job description into a standardized job posting; and integrate the standardized job posting into an employment system of the first entity.

Example 10 can include, or can optionally be combined with the subject matter of Example 9 to include, wherein standardizing the job title includes removing an occurrence of an undesired character, the removing performed using at least one regular expression.

Example 11 can include, or can optionally be combined with the subject matter of one or any combination of Examples 9 to 10 to include, wherein standardizing the job title includes at least one of: determining a geographical location within the job title and removing the determined geographical location from the job title; or determining an employer name within the job title and removing the determined employer name from the job title.

Example 12 can include, or can optionally be combined with the subject matter of one or any combination of Examples 9 to 11 to include, wherein standardizing the job title includes replacing an abbreviation within the job title with a word or a phrase that is recognized by the first entity as representing the abbreviation.

Example 13 can include, or can optionally be combined with the subject matter of one or any combination of Examples 9 to 12 to include, wherein replacing includes disambiguating the abbreviation using at least one of context within the job title and context within the job description.

Example 14 can include, or can optionally be combined with the subject matter of one or any combination of Examples 9 to 13 to include, wherein standardizing the job title includes: dividing the job title, comprising an ordered plurality of words, into a list of words; generating a plurality of permutations of words from the list of words; and choosing, from the plurality of permutations of words, a permutation of words that most closely matches at least one of the plurality of pre-defined job titles recognized by the first entity.

Example 15 can include, or can optionally be combined with the subject matter of one or any combination of Examples 9 to 14 to include, wherein standardizing the job title further includes determining a job title number and a job seniority level corresponding to the standardized job title, and wherein the job title number and the job seniority level are included in the standardized job posting.

Example 16 can include, or can optionally be combined with the subject matter of one or any combination of Examples 9 to 15 to include, wherein the standardized job posting includes at least one of an identification of a geographical location, an employer name, an employment industry, and a job skill.

Example 17 can include, or can optionally be combined with the subject matter of one or any combination of Examples 1 to 16 to include, subject matter (such as a method, a means for performing acts, or a machine-readable medium including instructions that, when performed by the machine cause the machine to performs acts) comprising: obtaining, by a first entity, data representing a job posting on a third-party system; standardizing the data to create a standardized job posting; assigning a first source value to the standardized job posting, the first source value determined, at least partially, by a source type of the third-party system; creating a first hash value for the standardized job posting and assigning the first hash value to the standardized job posting; determining that a substantially similar job posting, having a second source value and a second hash value, exists in an employment system of the first entity; and replacing, within the employment system of the first entity, the substantially similar job posting with the standardized job posting, the replacing performed in response to: the substantially similar job posting having been identified as not a paid job posting and the first source value being greater than the second source value.

Example 18 can include, or can optionally be combined with the subject matter of Example 17 to include, wherein the data representing the job posting on the third-party system includes a job title, a geographical location, and an employer name, wherein the standardized job posting includes a standardized job title, and wherein the first hash value for the standardized job posting is created based on the standardized job title, the geographical location, and the employer name.

Example 19 can include, or can optionally be combined with the subject matter of one or any combination of Examples 17 to 18 to include, wherein the source type of the third-party system is at least one of a web site of an employer, an electronic applicant tracking system, and an electronic job board.

Example 20 can include, or can optionally be combined with the subject matter of one or any combination of Examples 17 to 19 to include, wherein a source value for a web site of an employer is greater than the source value for an electronic applicant tracking system, and wherein the source value for an electronic applicant tracking system is greater than the source value for an electronic job board.

Example 21 can include, or can optionally be combined with the subject matter of one or any combination of Examples 17 to 20 to include, wherein the determining that the substantially similar job posting exists in the employment system of the first entity includes comparing the first hash value to a plurality of hash values of job postings within the employment system of the first entity, the plurality of hash values including the second hash value.

Example 22 can include, or can optionally be combined with the subject matter of one or any combination of Examples 17 to 21 to include, determining that the substantially similar job posting is the paid job posting, based on whether the first entity is remunerated, by at least one client of the first entity, for presenting the substantially similar job posting to at least one user of the employment system of the first entity.

Example 23 can include, or can optionally be combined with the subject matter of one or any combination of Example 17 to 22 to include, presenting, upon receiving a relevant job search submitted by a user of the employment system of the first entity, the standardized job posting to the user.

Example 24 can include, or can optionally be combined with the subject matter of one or any combination of Examples 1 to 23 to include, subject matter (such as an apparatus, a device, or a system) comprising: a machine including a memory and at least one processor; a job capture module, executable by the machine, configured to obtain, by a first entity, data representing a job posting on a third-party employment system; a job standardization module, executable by the machine, configured to standardize the job posting; and a job deduplication module, executable by the machine, configured to: assign a first source value to the standardized job posting, the first source value determined, at least partially, by a source type of the third-party system; create a first hash value for the standardized job posting and assigning the first hash value to the standardized job posting; determine that a substantially similar job posting, having a second source value and a second hash value, exists in an employment system of the first entity; and replace, within the employment system of the first entity, the substantially similar job posting with the standardized job posting, the replacing performed in response to: the substantially similar job posting having been identified as not a paid job posting and the first source value being greater than the second source value.

Example 25 can include, or can optionally be combined with the subject matter of Example 24 to include, wherein the data representing the job posting on the third-party system includes a job title, a geographical location, and an employer name, wherein the standardized job posting includes a standardized job title, and wherein the first hash value for the standardized job posting is created based on the standardized job title, the geographical location, and the employer name.

Example 26 can include, or can optionally be combined with the subject matter of one or any combination of Examples 24 to 25 to include, wherein the source type of the third-party system is at least one of a web site of an employer, an electronic applicant tracking system, and an electronic job board.

Example 27 can include, or can optionally be combined with the subject matter of one or any combination of Examples 24 to 26 to include, wherein a source value for a web site of an employer is greater than the source value for an electronic applicant tracking system, and wherein the source value for an electronic applicant tracking system is greater than the source value for an electronic job board.

Example 28 can include, or can optionally be combined with the subject matter of one or any combination of Examples 24 to 27 to include, wherein the job deduplication module is configured to determine, at least in part, that the substantially similar job posting exists in the employment system of the first entity by comparing the first hash value to a plurality of hash values of job postings within the employment system of the first entity, the plurality of hash values including the second hash value.

Example 29 can include, or can optionally be combined with the subject matter of one or any combination of Examples 24 to 28 to include, wherein the job deduplication module is configured to determine that the substantially similar job posting is the paid job posting, based at least in part on whether the first entity is remunerated, by at least one client of the first entity, for presenting the substantially similar job posting to at least one user of the employment system of the first entity.

Example 30 can include, or can optionally be combined with the subject matter of one or any combination of Examples 24 to 29 to include, a presentation module configured to present the standardized job posting to a user of the employment system of the first entity upon receiving a relevant job search submitted by the user.

Each of these non-limiting examples can stand on its own, or can be combined in various permutations or combinations with one or more of the other examples.

Conventional terms in the fields of computer networking and computer systems have been used herein. The terms are known in the art and are provided only as a non-limiting example for convenience purposes. Accordingly, the interpretation of the corresponding terms in the claims, unless stated otherwise, is not limited to any particular definition. Thus, the terms used in the claims should be given their broadest reasonable interpretation.

Although specific embodiments have been illustrated and described herein, it will be appreciated by those of ordinary skill in the art that any arrangement that is calculated to achieve the same purpose may be substituted for the specific embodiments shown. Many adaptations will be apparent to those of ordinary skill in the art. Accordingly, this application is intended to cover any adaptations or variations.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer-readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read-only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the embodiments should be determined with reference to the appended claims, along with the full scope of equivalents to which such claims are entitled.

What is claimed is:

1. A method comprising:
    obtaining, by a first entity, data representing a job posting on a third-party system;
    standardizing the data to create a standardized job posting;
    assigning a first source value to the standardized job posting, the first source value determined, at least partially, by a source type of the third-party system;
    creating a first hash value for the standardized job posting and assigning the first hash value to the standardized job posting;
    determining that a substantially similar job posting, having a second source value and a second hash value, exists in an employment system of the first entity; and
    replacing, within the employment system of the first entity, the substantially similar job posting with the standardized job posting, the replacing performed in response to:
        the substantially similar job posting having been identified as not a paid job posting and the first source value being greater than the second source value;
    wherein the source type of the third-party system is at least one of a web site of an employer, an electronic applicant tracking system, and an electronic job board; and
    wherein a source value for a web site of an employer is greater than the source value for an electronic applicant tracking system, and wherein the source value for an electronic applicant tracking system is greater than the source value for an electronic job board.

2. The method of claim 1, wherein the data representing the job posting on the third-party system includes a job title, a geographical location, and an employer name, wherein the standardized job posting includes a standardized job title, and wherein the first hash value for the standardized job posting is created based on the standardized job title, the geographical location, and the employer name.

3. The method of claim 1, wherein the determining that the substantially similar job posting exists in the employment system of the first entity includes comparing the first hash value to a plurality of hash values of job postings within the employment system of the first entity, the plurality of hash values including the second hash value.

4. The method of claim 1, comprising:
    determining that the substantially similar job posting is the paid job posting, based on whether the first entity is remunerated, by at least one client of the first entity, for presenting the substantially similar job posting to at least one user of the employment system of the first entity.

5. The method of claim 1, further comprising:
    presenting, upon receiving a relevant job search submitted by a user of the employment system of the first entity, the standardized job posting to the user.

6. A system comprising:
    a machine including a memory and at least one processor;
    a job capture module, executable by the machine, configured to obtain, by a first entity, data representing a job posting on a third-party employment system;
    a job standardization module, executable by the machine, configured to standardize the job posting; and
    a job deduplication module, executable by the machine, configured to:
        assign a first source value to the standardized job posting, the first source value determined, at least partially, by a source type of the third-party system;
        create a first hash value for the standardized job posting and assigning the first hash value to the standardized job posting;
        determine that a substantially similar job posting, having a second source value and a second hash value, exists in an employment system of the first entity; and
        replace, within the employment system of the first entity, the substantially similar job posting with the standardized job posting, the replacing performed in response to:
            the substantially similar job posting having been identified as not a paid job posting and
            the first source value being greater than the second source value;
    wherein the source type of the third-party system is at least one of a web site of an employer, an electronic applicant tracking system, and an electronic job board; and
    wherein a source value for a web site of an employer is greater than the source value for an electronic applicant tracking system, and wherein the source value for an electronic applicant tracking system is greater than the source value for an electronic job board.

7. The system of claim 6, wherein the data representing the job posting on the third-party system includes a job title, a geographical location, and an employer name, wherein the standardized job posting includes a standardized job title, and wherein the first hash value for the standardized job posting is created based on the standardized job title, the geographical location, and the employer name.

8. The system of claim 6, wherein the job deduplication module is configured to determine, at least in part, that the substantially similar job posting exists in the employment system of the first entity by comparing the first hash value to a plurality of hash values of job postings within the employment system of the first entity, the plurality of hash values including the second hash value.

9. The system of claim 6, wherein the job deduplication module is configured to determine that the substantially similar job posting is the paid job posting, based at least in part on whether the first entity is remunerated, by at least one client of the first entity, for presenting the substantially similar job posting to at least one user of the employment system of the first entity.

10. The system of claim 6, further comprising a presentation module configured to present the standardized job posting to a user of the employment system of the first entity upon receiving a relevant job search submitted by the user.

11. A non-transitory machine-readable storage medium comprising instructions that, when executed by one or more processors of a machine, cause the machine to perform operations comprising:

obtaining, by a first entity, data representing a job posting on a third-party system;

standardizing the data to create a standardized job posting;

assigning a first source value to the standardized job posting, the first source value determined, at least partially, by a source type of the third-party system;

creating a first hash value for the standardized job posting and assigning the first hash value to the standardized job posting;

determining that a substantially similar job posting, having a second source value and a second hash value, exists in an employment system of the first entity; and replacing, within the employment system of the first entity, the substantially similar job posting with the standardized job posting, the replacing performed in response to:

the substantially similar job posting having been identified as not a paid job posting and the first source value being greater than the second source value;

wherein the source type of the third-party system is at least one of a web site of an employer, an electronic applicant tracking system, and an electronic job board; and wherein a source value for a web site of an employer is greater than the source value for an electronic applicant tracking system, and wherein the source value for an electronic applicant tracking system is greater than the source value for an electronic job board.

12. The non-transitory machine-readable storage medium of claim 11, wherein the data representing the job posting on the third-party system includes a job title, a geographical location, and an employer name, wherein the standardized job posting includes a standardized job title, and wherein the first hash value for the standardized job posting is created based on the standardized job title, the geographical location, and the employer name.

13. The non-transitory machine-readable storage medium of claim 11, wherein the determining that the substantially similar job posting exists in the employment system of the first entity includes comparing the first hash value to a plurality of hash values of job postings within the employment system of the first entity, the plurality of hash values including the second hash value.

14. The non-transitory machine-readable storage medium of claim 11, comprising instructions to determine that the substantially similar job posting is the paid job posting, based on whether the first entity is remunerated, by at least one client of the first entity, for presenting the substantially similar job posting to at least one user of the employment system of the first entity.

15. The non-transitory machine-readable storage medium of claim 11, further comprising instructions to present the standardized job posting to a user of the employment system of the first entity upon receiving a relevant job search submitted by the user.

* * * * *

UNITED STATES PATENT AND TRADEMARK OFFICE
CERTIFICATE OF CORRECTION

PATENT NO. : 10,043,157 B2
APPLICATION NO. : 14/502261
DATED : August 7, 2018
INVENTOR(S) : Vembunarayan et al.

It is certified that error appears in the above-identified patent and that said Letters Patent is hereby corrected as shown below:

In the Claims

In Column 18, Line 33, in Claim 6, after "posting", insert --,--

In Column 19, Line 25, in Claim 11, after "posting", insert --,--

Signed and Sealed this
Ninth Day of July, 2019

Andrei Iancu
*Director of the United States Patent and Trademark Office*